US010042351B2

(12) United States Patent
Yang et al.

(10) Patent No.: US 10,042,351 B2
(45) Date of Patent: Aug. 7, 2018

(54) COMPUTER-IMPLEMENTED METHOD FOR MONITORING MACHINE TOOL BASED ON USER BEHAVIOR (71) Applicant: METAL INDUSTRIES RESEARCH & DEVELOPMENT CENTRE, Kaohsiung (TW)

(72) Inventors: Haw-Ching Yang, Tainan (TW); Min-Nan Wu, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 331 days.

(21) Appl. No.: 14/985,443

(22) Filed: Dec. 31, 2015

(65) Prior Publication Data

US 2017/0160720 A1  Jun. 8, 2017

(30) Foreign Application Priority Data

Dec. 4, 2015  (TW) .............................. 104140788 A (51) Int. Cl.
G05B 19/406  (2006.01)
(52) U.S. Cl.
CPC .. *G05B 19/406* (2013.01); *G05B 2219/37234* (2013.01)
(58) Field of Classification Search
CPC ................... G05B 19/406; G05B 2219/37234
See application file for complete search history.

(56) References Cited

U.S. PATENT DOCUMENTS

| 5,056,056 | A | | 10/1991 | Gustin | |
|---|---|---|---|---|---|
| 5,638,273 | A | * | 6/1997 | Coiner | G07C 5/085 360/5 |
| 6,601,014 | B1 | * | 7/2003 | Dempsey | H04M 15/47 702/108 |
| 7,647,131 | B1 | * | 1/2010 | Sadowski | G05B 23/0297 700/108 |
| 8,131,523 | B1 | | 3/2012 | Yunt et al. | |
| RE45,422 | E | * | 3/2015 | Beckman | G06F 3/0485 345/473 |

(Continued)

FOREIGN PATENT DOCUMENTS

| CN | 104682566 A | 6/2015 |
|---|---|---|
| TW | 200805437 | 1/2008 |

(Continued)

*Primary Examiner* — Mohammad Ali
*Assistant Examiner* — Vincent Chang
(74) *Attorney, Agent, or Firm* — CKC & Partners Co. Ltd.

(57) ABSTRACT

A computer-implemented method is provided. First, channel data is obtained, and whether the channel data complies with a predetermined condition of an event is determined. If the channel data complies with the predetermined condition, the channel data is recorded into a database according to a sampling frequency and a recording duration. The channel data corresponding to the event is obtained from the database, and is displayed according to a user operation. A replay frequency and stepping time interval corresponding to the user operation are obtained. The recording duration is adjusted according to the replay frequency, and the sampling frequency is adjusted according to the stepping time interval.

9 Claims, 5 Drawing Sheets (56) References Cited

U.S. PATENT DOCUMENTS

| | | | |
|---|---|---|---|
| 2006/0112031 A1* | 5/2006 | Ma | G06K 9/3233 |
| | | | 706/16 |
| 2008/0168308 A1* | 7/2008 | Eberbach | G06F 11/008 |
| | | | 714/26 |
| 2008/0294275 A1* | 11/2008 | Reichard | G05B 19/042 |
| | | | 700/88 |
| 2009/0144199 A1* | 6/2009 | Oertel | G06Q 10/00 |
| | | | 705/50 |
| 2011/0145711 A1 | 6/2011 | Njemanze et al. | |
| 2014/0148659 A1 | 5/2014 | Sloan et al. | |
| 2014/0324367 A1* | 10/2014 | Garvey, III | G01D 18/00 |
| | | | 702/56 |

FOREIGN PATENT DOCUMENTS

| | | |
|---|---|---|
| TW | I297506 | 6/2008 |
| TW | I328768 B | 8/2010 |
| TW | 201236610 A | 9/2012 |
| TW | I387227 B | 2/2013 |
| TW | M479248 U | 6/2014 |
| TW | I469039 B | 1/2015 |
| TW | I489232 B | 6/2015 |

* cited by examiner

COMPUTER-IMPLEMENTED METHOD FOR MONITORING MACHINE TOOL BASED ON USER BEHAVIOR

RELATED APPLICATIONS

This application claims priority to Taiwan Application Serial Number 104140788 filed on Dec. 4, 2015, which is herein incorporated by reference.

BACKGROUND

Field of Invention

The present invention relates to a computer-implemented method. More particularly, the present invention relates to an event-based monitoring method and a system for adjusting a way of recording according to a user behavior, and relates to a non-transitory computer readable medium thereof.

Description of Related Art

An automatic monitoring system is used to substitute human resource to monitor the state of the environment. Taking an automatic monitoring system for machine tool as an example, the system could monitor various channel data, such as image, voltage, current, temperature, and acceleration data of the machine tool, and compare these values with predetermined conditions to determine whether a particular event happens, and then records the related data of the event with timestamps. Therefore, the user can review the monitoring data by event and perform a root cause analysis by timestamp so as to execute a proper manufacturing strategy. However, the conventional event-based monitoring system records the channel data in a fixed way. That is the recorded duration and resolution of the data of an event are fixed. When a particular event is reviewed, the result of root cause analysis is limited by the insufficient data duration or resolution.

In general, if the recording duration is longer and the sampling frequency is higher, then the data quality of the event will be higher for analysis; but, it also needs more space for storing increased data. Therefore, there is a tradeoff between the quality of the data and the cost of the storage space. On the other hand, different events may need different recoding durations and resolutions depending on user requirements. Accordingly, how to adjust the recording durations and resolutions of the event data automatically is an issue concerned by the people in the art.

SUMMARY

Embodiments of the invention provide a computer-implemented method for a machine tool. A sensor is installed on the machine tool, and the computer-implemented method includes: obtaining, by a processor, first channel data from the sensor; determining, by the processor, whether the first channel data complies with a predetermined condition of an event, and automatically storing the first channel data into a storage space (e.g. database) according to a sampling frequency and a recording duration when the first channel data complies with the predetermined condition; obtaining, by the processor, the first channel data corresponding to the event from the storage space, and displaying the first channel data on a screen according to a user operation; obtaining, by the processor, a replay frequency and stepping time interval corresponding to the user operation, where the stepping time interval indicates time elapsed between two stepping instructions; automatically adjusting the recording duration according to the replay frequency, and adjusting the sampling frequency (i.e. data resolution) according to the stepping time interval; and automatically storing second channel data obtained from the sensor into the storage space according to the adjusted sampling frequency and the adjusted recording duration when the second channel data complies with the predetermined condition of the event.

In an embodiment, the step of adjusting the recording duration according to the replay frequency is performed according to equation (1).

$$R = \frac{L_r}{1 + e^{-k_r(c-c_0)}} + R_0, \quad (1)$$

where R is a rate of the recording duration, $L_r$ is a maximum rate corresponding to the recording duration, $k_r$ is a factor corresponding to the recording duration, c is the replay frequency, $c_0$ is a reference frequency, and $R_0$ is an initial rate of the recording duration.

In an embodiment, the computer-implemented method further includes: using different reference frequencies $c_0$ when increasing the recording duration and decreasing the recording duration.

In an embodiment, the step of adjusting the sampling frequency according to the stepping time interval is performed according to equation (2).

$$S = \frac{L_s}{1 + e^{-k_s(t-t_0)}} + S_0, \quad (2)$$

where S a rate of the sampling frequency, $L_s$ is a maximum rate corresponding to the sampling frequency, $k_s$ is a factor corresponding to the sampling frequency, t is the stepping time interval, $t_0$ is a reference time interval, and $S_0$ is an initial rate of the sampling frequency.

In an embodiment, the computer-implemented method further includes: using different reference time intervals $t_0$ when increasing the sampling frequency and decreasing the sampling frequency.

In an embodiment, the step of determining whether the first channel data complies with the predetermined condition of the event includes: determining that the first channel data complies with the predetermined condition if a current value of the first channel data is not within three standard deviations of a mean of the channel data.

In an embodiment, the step of obtaining the replay frequency and the stepping time interval includes: obtaining multiple first replay frequencies, eliminating a predetermined percentage of extreme values among the first replay frequencies, and calculating an average value of rest of the first replay frequencies as the replay frequency; and obtaining multiple first stepping time intervals, eliminating the predetermined percentage of extreme values among the first stepping time intervals, and calculating an average value of rest of the first stepping time intervals as the stepping time interval.

In an embodiment, the first channel data includes voltage, current, temperature or vibration data of an axis in the machine tool.

Embodiments of the invention provide a non-transitory computer readable recording medium recording program instructions for: obtaining, by a processor, first channel data from the sensor; determining, by the processor, whether the first channel data complies with a predetermined condition of an event, and automatically storing the first channel data into a storage space according to a sampling frequency and a recording duration when the first channel data complies with the predetermined condition; obtaining, by the processor, the first channel data corresponding to the event from the storage space, and displaying the first channel data on a screen according to a user operation; obtaining, by the processor, a replay frequency and stepping time interval corresponding to the user operation, where the stepping time interval indicates time elapsed between two stepping instructions; automatically adjusting the recording duration according to the replay frequency, and adjusting the sampling frequency according to the stepping time interval; and automatically storing second channel data obtained from the sensor into the storage space according to the adjusted sampling frequency and the adjusted recording duration when the second channel data complies with the predetermined condition of the event.

Embodiments of the invention provide a monitoring system for a machine tool. A sensor is installed on the machine tool, and the monitor system includes a data acquiring circuit, a data analysis circuit and a data display circuit. The data acquiring circuit obtains first channel data from the sensor. The data analysis circuit determines whether the first channel data complies with a predetermined condition of an event, and automatically stores the first channel data into a storage space according to a sampling frequency and a recording duration when the first channel data complies with the predetermined condition. The data analysis circuit also obtains the first channel data corresponding to the event from the storage space. The data display circuit displays the first channel data according to a user operation. The data analysis circuit obtains a replay frequency and stepping time interval corresponding to the user operation, and automatically adjusts the recording duration according to the replay frequency, and adjusts the sampling frequency according to the stepping time interval. The data analysis circuit automatically stores second channel data obtained from the sensor into the storage space according to the adjusted sampling frequency and the adjusted recording duration when the second channel data complies with the predetermined condition of the event.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identify units or data described by the same terminology, but are not referred to particular order or sequence.

[First Embodiment]

Figure 1:
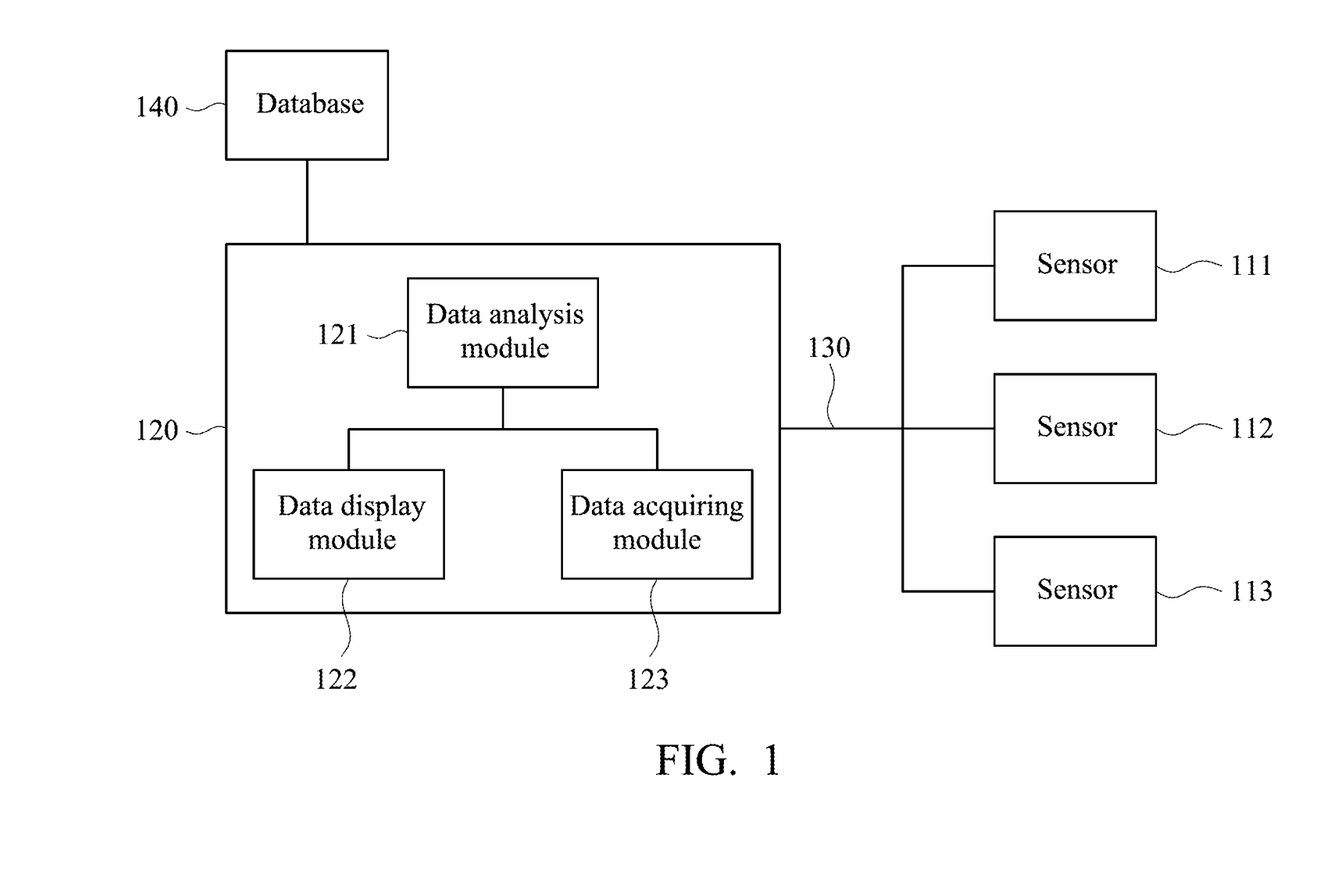
FIG. 1 is a schematic diagram illustrating an automatic monitoring system according to a first embodiment.

FIG. 1 is a schematic diagram illustrating an automatic monitoring system according to a first embodiment. An automatic monitoring system 120 includes a data analysis module 121, a data display module 122 and a data acquiring module 123. These modules can be implemented as circuits or program codes, and the invention is not limited thereto. For example, the data analysis module 121 may be referred to an analysis circuit, the data display module 122 may be referred to a data display circuit, and the data acquiring module 123 may be referred to a data acquiring circuit. Sensors 111-113 are installed in an environment, such as a machine tool, to be monitored. In the embodiment, the sensors 111-113 are configured to detect voltage, current, temperature or vibration data of an axis in the machine tool. Alternatively, the sensors 111-113 may also include a camera. In some embodiments, each of the sensors 111-113 can be connected to an analog-to-digital converter. However, the sensors 111-113 in FIG. 1 are just examples, and the number and the types of the sensors 111-113 are not limited in the invention. Herein, each of the sensors 111-113 is also referred to a channel, and the values sensed by the sensors 111-113 are referred to channel data 130.

The data acquiring module 123 obtains the channel data 130 (e.g. voltage, current, temperature, or vibration data of an axis in the machine tool) from the sensors 111-113. The data analysis module 121 determines whether the channel data 130 complies with a predetermined condition of an event. When the channel data 130 complies with the predetermined condition, the data analysis module 121 records the channel data 130 according to a sampling frequency and a recording duration and stores the data into a database 140. For example, if the recording duration is 30 secs and the sampling frequency is 10 Hz, the recorded quantity of each channel data is 300. In other words, the recording duration and the sampling frequency affect the quantity of the recorded data. The values are just examples which are not limited in the invention.

After the channel data is stored in the database 140, when a user wants to review the channel data, the user may first select an event to be reviewed. Then, the data display module 122 obtains the channel data correspond to the selected event from the database, and displays the obtained channel data on a screen according to a user operation. For example, the user operation may include display, pause, forward, backward, stepping, etc., which are not limited in the invention. The operation "stepping" is used in a scenario that the user first sets sever breaking points in the channel data, and when the user performs the instruction "stepping", the data display module 122 jumps from a current breaking point to a next breaking point, and displays the channel data corresponding to the next breaking point. When the user reviews the channel data, the data analysis module 121 records the user operation, and obtains a replay frequency and stepping time interval corresponding to the user operation. The replay frequency indicates how many times the user replays the channel data of the event during a predefined period. The stepping time interval indicates the average time intervals of stepping instructions during reviewing an identical event performed by users. The data analysis module 121 automatically adjusts the recording duration according to the replay frequency, and adjusts the sampling frequency according to the stepping time interval. Next, when another channel data (also referred to second channel data) complies with the predetermined condition of the event, the second channel data is automatically stored into the database according to the adjusted sampling frequency and the adjusted recording duration. As a result, the recording duration and the sampling frequency are adjusted by event according to the user behavior, and thus the channel data corresponding to the event is recorded efficiently, and the required storage quantity may be reduced.

[Second Embodiment]

Figure 2:
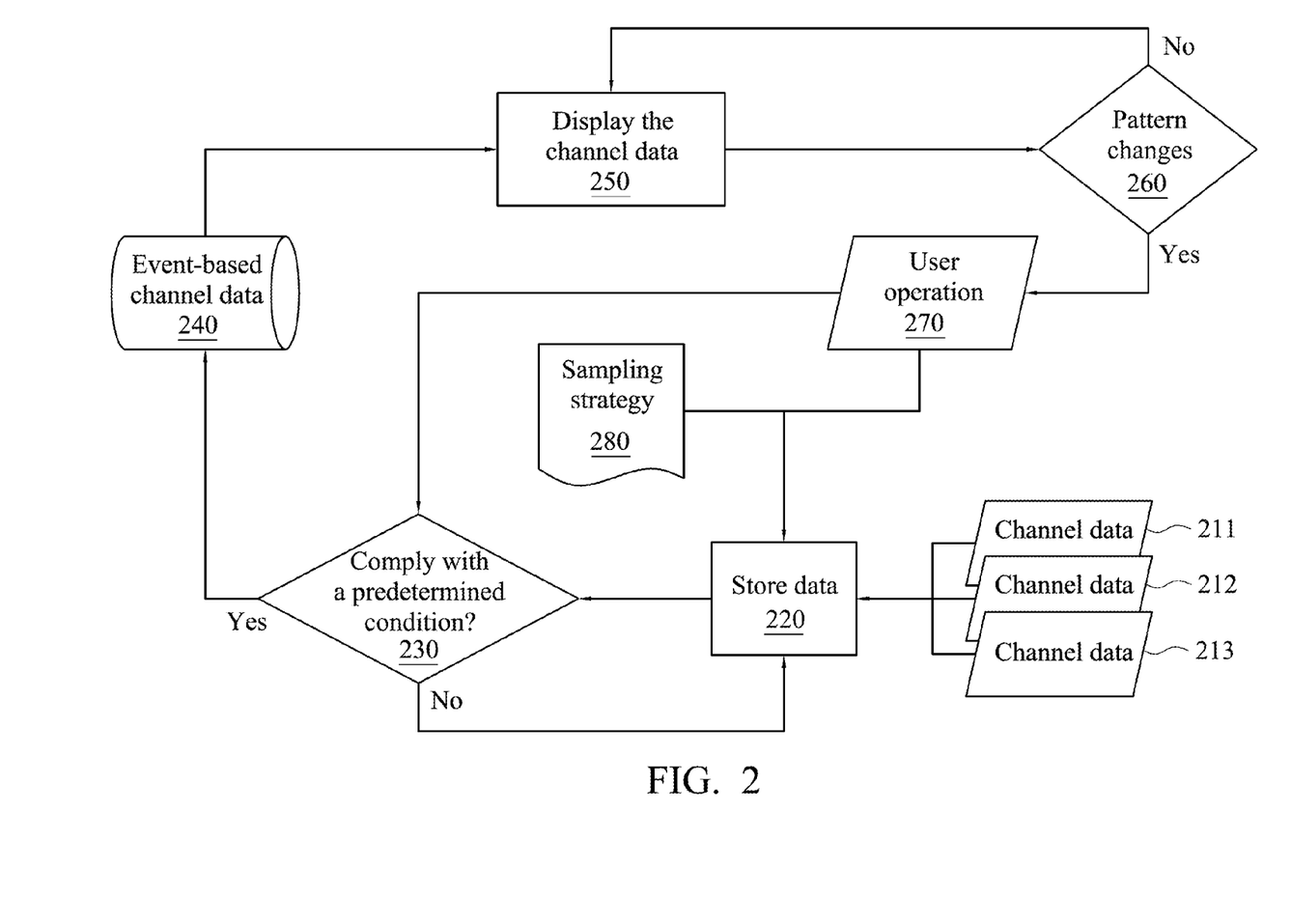
FIG. 2 is a flow chart of an automatic monitoring method according to a second embodiment.

FIG. 2 is a flow chart of an automatic monitoring method according to the second embodiment. The steps in FIG. 2 may be implemented as program instructions and executed by a system including a processor and a memory. Referring to FIG. 2, channel data 211-213 is first obtained. Next, in step 220, the channel data 211-213 is temporarily stored in a memory (e.g. a random access memory). In step 230, the system determines whether the channel data 211-213 complies with a predetermined condition of a particular event. For each channel data, the system may set different predetermined conditions. For example, the event indicates the voltage is abnormal, and the predetermined condition is satisfied when the voltage is over a predetermined value. The predetermined value may be decided by a statistic way. For example, the system may first calculate the mean and the standard deviation of the voltage in the training phase. In the execution phase, when a current value of the voltage is not within a number of standard deviations (e.g. three standard deviations) of the mean of the channel data, the system would determine that the predetermined condition for the abnormal voltage is satisfied. Herein, "not within three standard deviations of the mean" indicates the current value is higher than the sum of the mean and three times of the stand deviation, or the current value is lower than the mean minus three times of the stand deviation. Nonetheless, the system may set another predetermined condition in other embodiments. The contents of the event and the predetermined condition are not limited in the invention.

If the channel data does not comply with the predetermined condition, the channel data is maintained in the memory. If the channel data complies with the predetermined condition, the system will automatically store the channel data into a database according to a recording duration and a sampling frequency. Herein, the recording duration includes a first duration before the event triggered and a second duration after the event triggered. In some embodiments, the first duration and the second duration are the same, but they may be different in other embodiments. For example, the system may set a predetermined ratio of the first duration to the second duration, which is not limited in the invention. In addition, the system may also store operation information of the machine tool into the database. For example, the system may store machining data of the machine tool, such as operation path, spindle speed, depth of cut, coordinates of each axes, cutter compensation, etc. The data structure of the database, and whether the system stores other information are not limited in the invention. In some embodiments, the system also records the event in an abnormal event list.

Event-based channel data 240 is stored in the database. The user can review the recorded events by displaying the corresponding channel data (step 250). In some embodiments, the system will review one or more records according to the timestamps of the event, and displays the channel data in the database. Nonetheless, the user may use other retrieving approaches in other embodiments, and the invention is not limited thereto.

The retrieved data is displayed on a user interface, which can be controlled by a user. For example, the user may perform operations of play, pause, forward, backward, step, etc. The content of the interface is not limited in the invention. When the user interacts with the user interface, the system will analyze the operation pattern of the user, and determine whether the operation pattern changes in step 260. To be specific, the system calculates the replay frequency of the event performed by the user, and evaluates the change degree of the replay frequency. Simultaneously, the system calculates average time intervals of stepping instructions in reviewing an identical event performed by the user, and determines change degree of the stepping time intervals. If the change pattern is significant, the system will analyze user operation 270, and obtain updated replay frequency and stepping time interval corresponding to the user operation 270. In detail, for a particular event, the system obtains weeks of replay frequency data, and eliminates a predetermined percentage (e.g. 2.5%) of extreme data among the replay frequency data. That is, the system derives an average value of (i.e. 95%) of the replay frequencies as the replay frequency by eliminating the top 2.5% and the last 2.5% of the replay frequency data. Similarly, the system also obtains weeks of stepping time interval data, eliminates the predetermined percentage (e.g. 2.5%) of extreme values among the stepping time interval data, and calculates an average value of the stepping time intervals for later usage.

Figure 3:
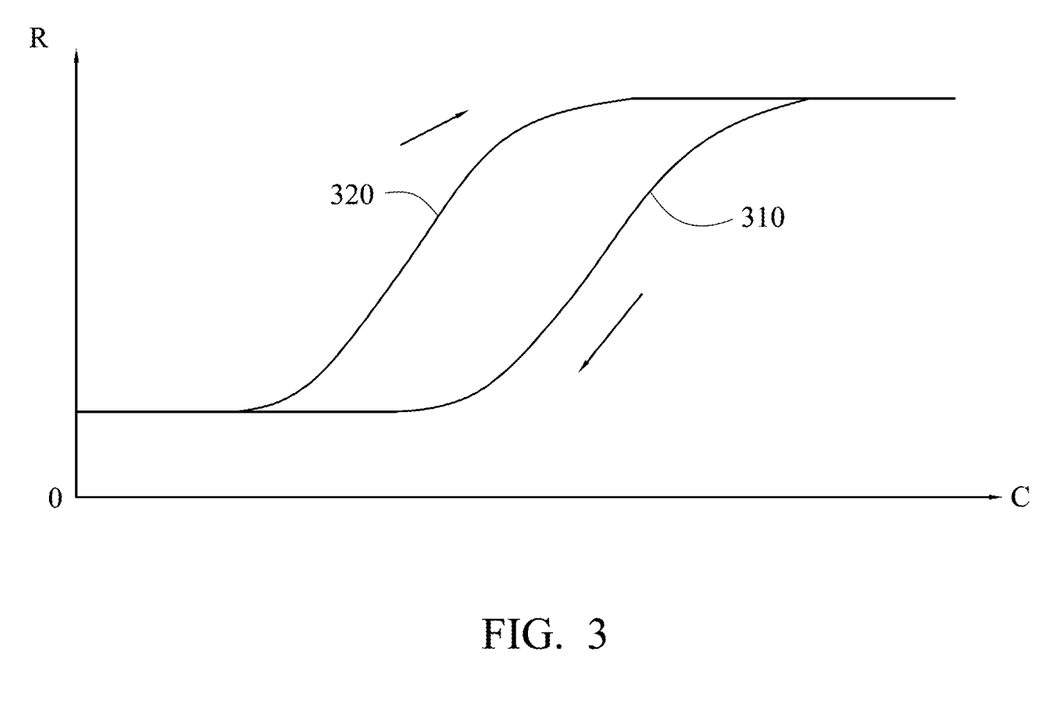
FIG. 3 is a diagram illustrating the adjustment of a recording duration according to the second embodiment.

The system updates a sampling strategy 280 according to the calculated replay frequency and the stepping time interval. To be specific, the system substitutes the replay frequency into a logistic function to increase or decrease the recording duration. The step could be represented as following equation $$R = \frac{L_r}{1 + e^{-k_r(c-c_0)}} + R_0, \quad (1)$$

where R denotes a rate of the recording duration, in which the multiplication of the rate R and a predefined value equals to the updated recording duration. $L_r$ denotes a maximum rate corresponding to the recording duration. $k_r$ denotes a factor corresponding to the recording duration. c denotes the aforementioned replay frequency. $c_0$ denotes a reference frequency, such as a median of several replay frequencies. $R_0$ denotes an initial rate of the recording duration. All the variables are real numbers, but the values thereof are not limited in the invention. Referring to FIG. 3, FIG. 3 is a diagram illustrating the adjustment of the recording duration according to the second embodiment. The rate R increases along with the replay frequency c. In some embodiments, the system uses different reference frequencies $c_0$ when increasing the recording duration and decreasing the recording duration. Therefore, the rate R increases and decreases along different curves, in which a curve 310 indicates a decreasing path, and a curve 320 indicates an increasing path.

Figure 4:
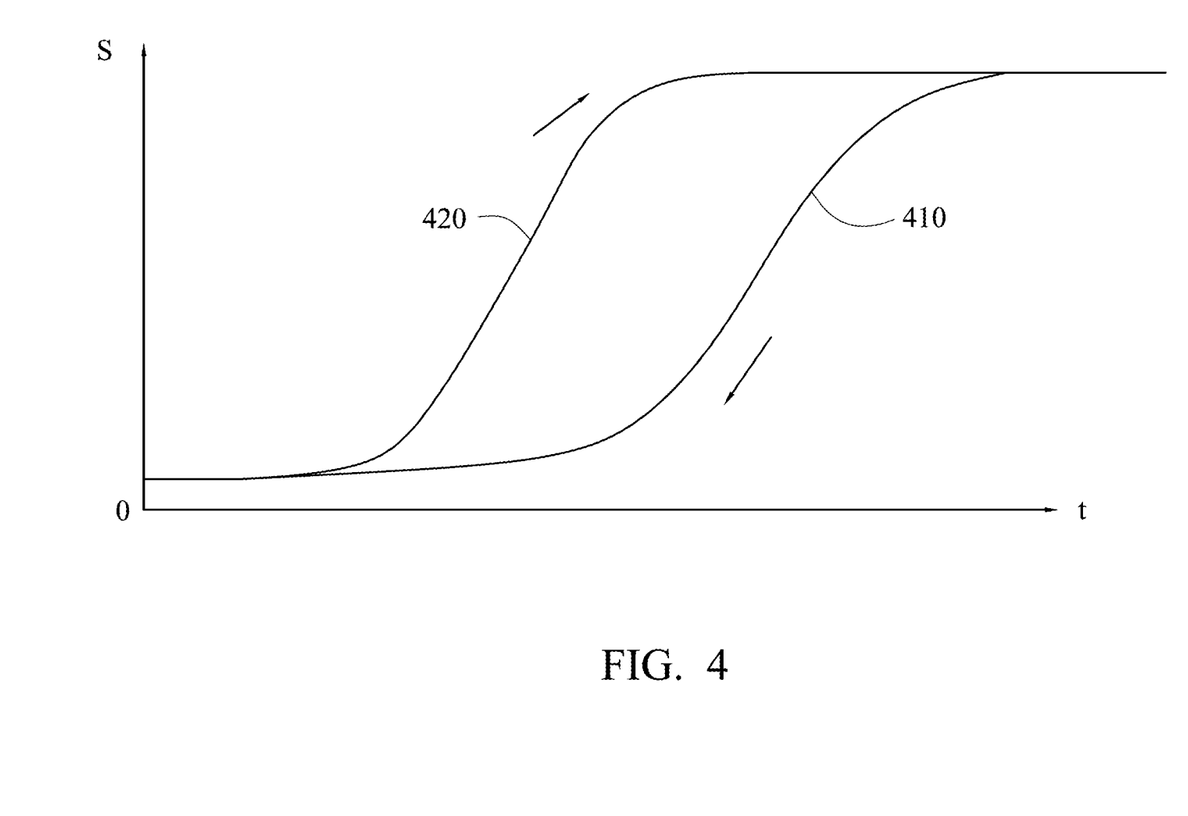
FIG. 4 is a diagram illustrating the adjustment of a sampling frequency according to the second embodiment.

On the other hand, the system substitutes the stepping time interval into the logistic function to increase or decrease the sampling frequency. This step could be represented as following equation (2).

$$S = \frac{L_s}{1+e^{-k_s(t-t_0)}} + S_0, \qquad (2)$$

where S denotes a rate of the sampling frequency, in which the multiplication of the rate S and a predefined value equals to the updated sampling frequency. $L_s$ denotes a maximum rate corresponding to the sampling frequency. $k_s$ denotes a response speed corresponding to the sampling frequency. t denotes the stepping time interval. $t_0$ denotes a reference time interval such as a median of several stepping time intervals. $S_0$ denotes an initial rate of the sampling frequency. These variables are real numbers, but the values thereof are not limited in the invention. Referring to FIG. 4, FIG. 4 is a diagram illustrating the adjustment of a sampling frequency according to the second embodiment. The stepping time interval t increases along with the rate S. In some embodiments, the system uses different reference time intervals $t_0$ when increasing and decreasing the sampling frequency. Therefore, the rate S increases and decreases along different curves, in which curve 410 represents a decreasing path, and curve 420 represents an increasing path.

Referring to FIG. 2 again, after updating the sampling strategy 280, the channel data is recorded into the database according to the updated recording duration and the updated sampling frequency. Therefore, the way of recording and the required storage quantity are adjusted automatically. For example, when the user replays the channel data of an event very often, it means the event is relatively important, and thus the recording duration is increased. If the users hold longer between two stepping instructions, it means the user cares about the channel data between the two corresponding breaking points, and thus the sampling frequency is increased to improve the time resolution of the channel data.

[Third Embodiment]

Figure 5:
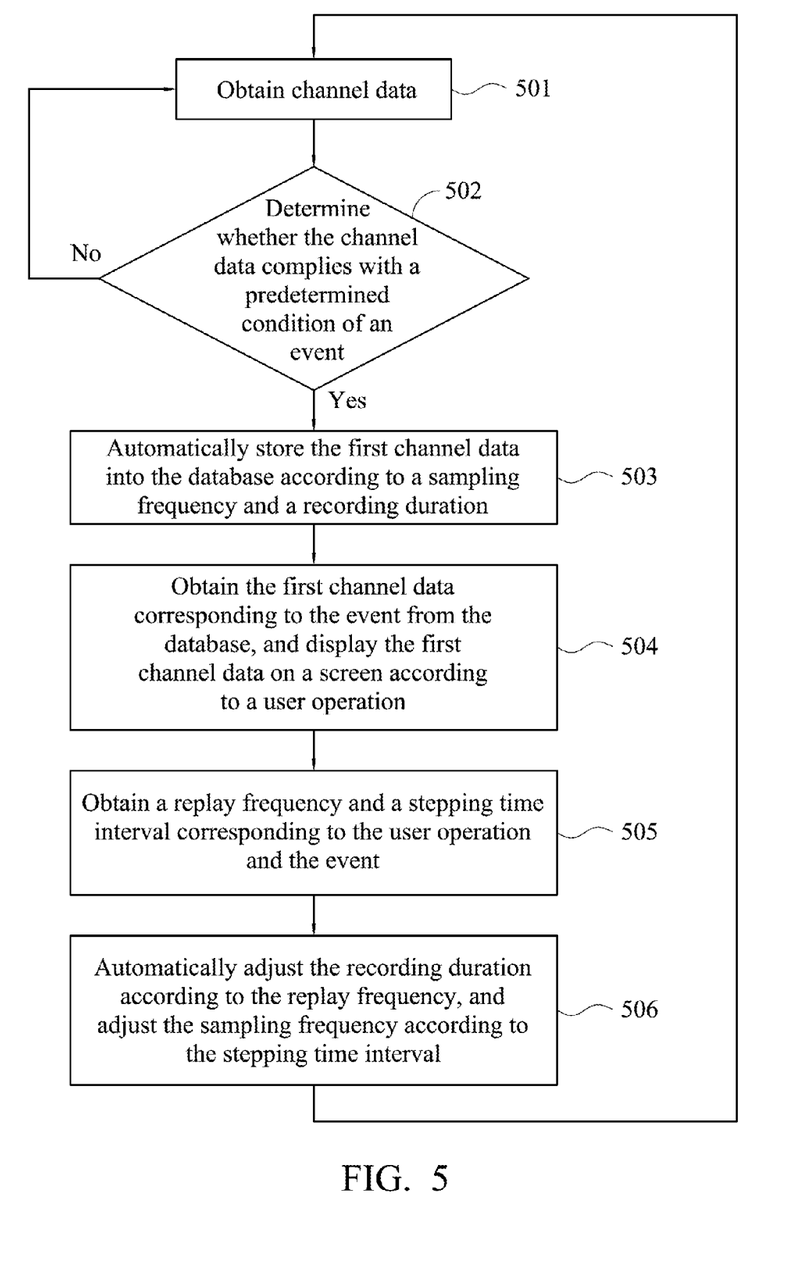
FIG. 5 is a flow chart of an automatic monitoring method according to a third embodiment.

FIG. 5 is a flow chart of an automatic monitoring method according to a third embodiment. Referring to FIG. 5, in step 501, channel data (also referred to first channel data) is obtained from a sensor installed on a machine tool. In step 502, whether the channel data complies with a predetermined condition of an event is determined. If the channel data complies with the predetermined condition, in step 503, the channel data is stored into the database according to a sampling frequency and a recording duration. In step 504, the channel data corresponding to the event is obtained from the database, and the channel data is displayed on a screen according to a user operation. In step 505, a replay frequency and stepping time interval corresponding to the user operation and the event are obtained. In step 506, the recording duration is automatically adjusted according to the replay frequency, and the sampling frequency is adjusted according to the stepping time interval. Then, it's back to the step 501 to obtain another channel data (also referred to second channel data). The second channel data will be automatically stored into the database according to the adjusted sampling frequency and the adjusted recording duration when the second channel data complies with the predetermined condition of the event. Each step of FIG. 5 has been described in detail above, and therefore the description will not be repeated. Note that the steps of FIG. 5 may be implemented as circuits or program instructions. In addition, the method of FIG. 5 may be performed with the embodiments discussed above, or performed independently. In other words, other steps may be inserted into the steps of FIG. 5.

Embodiments of the invention also provide a non-transitory computer readable storage medium storing program instructions. The program instructions are executed to perform the automatic monitoring method disclosed in FIG. 2 or FIG. 5. For example, the non-transitory computer readable storage medium may be a floppy disk, a hard disk, an optical disk, a read-only optical disk, a magnetic disk, a read-only memory, a random access memory, an Erasable Programmable Read-Only Memory (EPROM), an Electrically-Erasable Programmable Read-Only Memory (EEPROM), an optical card, a magnetic card, a flash memory, or any suitable computer readable medium for recording program instructions.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A computer-implemented method for a machine tool, wherein a sensor is installed on the machine tool, the computer-implemented method comprising:
   obtaining, by a processor, first channel data from the sensor;
   determining, by the processor, whether the first channel data complies with a predetermined condition of an event, and automatically storing the first channel data into a database according to a sampling frequency and a recording duration when the first channel data complies with the predetermined condition;
   obtaining, by the processor, the first channel data corresponding to the event from the database, and displaying the first channel data on a screen according to a user operation;
   obtaining, by the processor, a replay frequency and stepping time interval corresponding to the user operation, where the stepping time interval indicates time elapsed between two stepping instructions;
   automatically adjusting the recording duration according to the replay frequency, and adjusting the sampling frequency according to the stepping time interval; and
   automatically storing second channel data obtained from the sensor into the database according to the adjusted sampling frequency and the adjusted recording duration when the second channel data complies with the predetermined condition of the event,
   wherein the step of adjusting the recording duration according to the replay frequency is performed according to an equation (1):

$$R = \frac{L_r}{1+e^{-k_r(c-c_0)}} + R_0, \qquad (1)$$

wherein R is a rate of the recording duration, $L_r$ is a maximum rate corresponding to the recording duration, $k_r$ is a response speed corresponding to the recording duration, c is the replay frequency, $c_0$ is a reference frequency, and $R_0$ is an initial rate of the recording duration.

2. The computer-implemented method of claim 1, further comprising:
using different reference frequencies $c_0$ when increasing the recording duration and decreasing the recording duration.

3. The computer-implemented method of claim 1, wherein the step of adjusting the sampling frequency according to the stepping time interval is performed according to an equation (2):

$$S = \frac{L_s}{1+e^{-k_s(t-t_0)}} + S_0, \quad (2)$$

wherein S a rate of the sampling frequency, $L_s$ is a maximum rate corresponding to the sampling frequency, $k_s$ is a response speed corresponding to the sampling frequency, t is the stepping time interval, $t_0$ is a reference time interval, $S_0$ is an initial rate of the sampling frequency.

4. The computer-implemented method of claim 3, further comprising:
using different reference time intervals $t_0$ when increasing the sampling frequency and decreasing the sampling frequency.

5. The computer-implemented method of claim 1, wherein the step of determining whether the first channel data complies with the predetermined condition of the event comprises:
determining that the first channel data complies with the predetermined condition if a current value of the first channel data is not within three standard deviations of a mean of the first channel data.

6. The computer-implemented method of claim 1, wherein the step of obtaining the replay frequency and the stepping time interval comprises:
obtaining a plurality of first replay frequencies, eliminating a predetermined percentage of extreme values among the first replay frequencies, and calculating an average value of rest of the first replay frequencies as the replay frequency; and
obtaining a plurality of first stepping time intervals, eliminating the predetermined percentage of extreme values among the first stepping time intervals, and calculating an average value of rest of the first stepping time intervals as the stepping time interval.

7. The computer-implemented method of claim 1, wherein the first channel data comprises voltage, current, temperature or vibration data of an axis in the machine tool.

8. A non-transitory computer readable recording medium, recording program instructions for:
obtaining, by a processor, first channel data from a sensor installed on a toll machine;
determining, by the processor, whether the first channel data complies with a predetermined condition of an event, and automatically storing the first channel data into a database according to a sampling frequency and a recording duration when the first channel data complies with the predetermined condition;
obtaining, by the processor, the first channel data corresponding to the event from the database, and displaying the first channel data on a screen according to a user operation;
obtaining, by the processor, a replay frequency and stepping time interval corresponding to the user operation,
where the stepping time interval indicates time elapsed between two stepping instructions; and
automatically adjusting the recording duration according to the replay frequency, and adjusting the sampling frequency according to the stepping time interval; and
automatically storing second channel data obtained from the sensor into the database according to the adjusted sampling frequency and the adjusted recording duration when the second channel data complies with the predetermined condition of the event,
wherein the step of adjusting the recording duration according to the replay frequency is performed according to an equation (1):

$$R = \frac{L_r}{1+e^{-k_r(c-c_0)}} + R_0, \quad (1)$$

wherein R is a rate of the recording duration, $L_r$ is a maximum rate corresponding to the recording duration, $k_r$ is a response speed corresponding to the recording duration, c is the replay frequency, $c_0$ is a reference frequency, and $R_0$ is an initial rate of the recording duration.

9. A monitoring system for a machine tool, wherein a sensor is installed on the machine tool, the monitoring system comprising:
a data acquiring circuit, obtaining first channel data from the sensor;
a data analysis circuit, determining whether the first channel data complies with a predetermined condition of an event, and automatically storing the first channel data into a database according to a sampling frequency and a recording duration when the first channel data complies with the predetermined condition, and obtains the first channel data corresponding to the event from the database; and
a data display circuit, displaying the first channel data according to a user operation,
wherein the data analysis circuit obtains a replay frequency and stepping time interval corresponding to the user operation, and automatically adjusting the recording duration according to the replay frequency, and adjusting the sampling frequency according to the stepping time interval, wherein the stepping time interval indicates time elapsed between two stepping instructions,
wherein the data analysis circuit automatically stores second channel data obtained from the sensor into the database according to the adjusted sampling frequency and the adjusted recording duration when the second channel data complies with the predetermined condition of the event,
wherein the data analysis circuit adjusts the recording duration according to an equation (1):

$$R = \frac{L_r}{1+e^{-k_r(c-c_0)}} + R_0, \quad (1)$$

wherein R is a rate of the recording duration, $L_r$ is a maximum rate corresponding to the recording duration, $k_r$ is a response speed corresponding to the recording duration, c is the replay frequency, $c_0$ is a reference frequency, and $R_0$ is an initial rate of the recording duration.

* * * * *